United States Patent
Lee et al.

(10) Patent No.: US 7,130,755 B2
(45) Date of Patent: Oct. 31, 2006

(54) NEAR-FIELD SCANNING MICROWAVE MICROSCOPE USING DIELECTRIC RESONATOR

(75) Inventors: Kie Jin Lee, Seoul (KR); Joo Young Kim, Paju (KR); Hyun Jun Yoo, Suwon (KR); Jong Il Yang, Seoul (KR); Song Hui Kim, Daejeon (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 0 days.

(21) Appl. No.: 11/116,010

(22) Filed: Apr. 27, 2005

(65) Prior Publication Data
US 2005/0246129 A1    Nov. 3, 2005

(30) Foreign Application Priority Data
Apr. 30, 2004    (KR) ...................... 10-2004-0030469

(51) Int. Cl.
*G01C 25/00*     (2006.01)
*G06F 19/00*     (2006.01)
(52) U.S. Cl. ..................................... 702/97
(58) Field of Classification Search ............... 702/14, 702/16, 38, 40, 97; 324/642, 646, 668; 73/105; 250/306
See application file for complete search history.

(56) References Cited

U.S. PATENT DOCUMENTS 6,194,711 B1 *   2/2001   Tomita ..................... 250/234

6,532,806 B1 *   3/2003   Xiang et al. ................. 73/105

OTHER PUBLICATIONS

D.E. Steinhauer, et al., Imaging of Microwave Permittivity, and Damage Recovery in (Ba, Sr.) TiO$_3$ Thin Films, Applied Physics Letter, vol. 75, No. 20, Nov. 15, 1999, pp. 3180-3182.
Michael Golosovky, et al., Novel Millimeter-Wave Near-Field Resistivity Microscope, Applied Physics Letter, vol. 68, No. 11, Mar. 11, 1996.

* cited by examiner

*Primary Examiner*—Michael Nghiem
(74) *Attorney, Agent, or Firm*—Frommer Lawrence & Haug LLP; Ronald R. Santucci

(57) ABSTRACT

Provided is a near-field microscope using a dielectric resonator, which makes it possible to minimize influences by external environments, and to enhance its sensitivity, resolution and function by adjusting the distance between a sample and an apex of a probe. The near-field microscope includes a wave source, a dielectric resonator, a probe, a distance adjusting unit, and a detector. The wave source generates a wave, and a frequency of the wave is adjustable by the wave source. The dielectric resonator propagates the wave from the wave source, and a resonance frequency, impedance, a Q factor and an electromagnetic wave mode of the wave is freely adjustable. The probe scans the wave output from the dielectric resonator on a sample. The distance adjusting unit measures a distance between the probe and the sample and maintains the distance to a predetermined value. The detector detects a wave that propagates through the probe, interacts with the sample and then propagates through the probe and the dielectric resonator.

22 Claims, 26 Drawing Sheets

NEAR-FIELD SCANNING MICROWAVE MICROSCOPE USING DIELECTRIC RESONATOR

CROSS-REFERENCE TO RELATED PATENT APPLICATION

This application claims the benefit of Korean Patent Application No. 10-2004-0030469, filed on Apr. 30, 2004, in the Korean Intellectual Property Office, the disclosure of which is incorporated herein in its entirety by reference.

BACKGROUND OF THE INVENTION

1. Field of the Invention

The present invention relates to a near-field scanning microwave microscope, and more particularly, to a near-field scanning microwave microscope, which can minimize the bad influence of temperature or external environments thereon and enhance its sensitivity and resolution by connecting a probe to a dielectric resonator.

2. Description of the Related Art

An optical microscope for measuring the shape of a nanosize sample has a limited resolution due to a diffraction limit because it observes the shape of an object using light. That is, an object having a size smaller than the half of a light wavelength cannot be optically measured due to the diffraction limit. Accordingly, there has been developed a near-field scanning microwave microscope that can overcome the diffraction limit and thus measure an optical characteristic of an object having a size much smaller than a light wavelength. In the near-field scanning microwave microscope, light having passed through a microscopic aperture smaller than a light wavelength is scanned on a sample spaced apart from the aperture by a distance equal to or smaller than a diameter of the aperture, whereby the diffraction limit can be overcome because a near field spaced apart from a surface of the sample by a distance smaller than a light wavelength is not diffracted.

A study for a noncontact or nondestructive microscope using an evanescent or near field effect has been introduced as one field of a surface study after a scanning tunneling microscope (STM) and an atomic force microscope (AFM) were realized. Due to the development of optical microscope technology, the measurement of a characteristic of a sample through the existing optical method has been converted from a macroscopic view into a microscope view. Accordingly, a method for measuring a microscopic characteristic of a sample has been spotlighted as a new study field. Meanwhile, with the integration of various electronic components, a study for a physical characteristic of a fine structure is being highlighted as an important project. Specifically, the development of new measuring equipment capable of overcoming a diffraction limit becomes essential for understanding and measuring a physical characteristic of a fine structure.

A microscope using a near-field effect has been developed as one means for overcoming the diffraction limit. Specifically, with the integration of communication components, the development of a near-field microscope in a millimeter wave region or a microwave region has been required for a study on an optical characteristic of a fine structure of an integrated device.

An experiment for a near field using a microwave was first executed by Ash and Nicholls, and a near-field microwave microscope has been continuously developed and is being applied to various technical fields. Examples of methods for obtaining a near-field microwave image include a method using a coaxial cable resonator, a method using a stripline resonator, and a method using a waveguide slit.

FIG. 1 illustrates a conventional near-field optical microscope using a coaxial cable resonator, which is disclosed in "APPLIED PHYSICS LETTERS, VOLUME 75, NUMBER 20".

In the above near-field optical microscope, a wave output from a microwave source 100 propagates through a coaxial cable resonator 103, and is transmitted through a probe formed at an end portion of resonator 103 to a sample 107 whose optical characteristic needs to be measured. A wave output from the probe 105 interacts with the sample 107, and is then again input through the probe 105 to the resonator 103. A microwave deformed by an interaction with the sample 107 is detected by a detector 110. In this manner, microscopic and optical characteristics of the sample 107 can be measured. Here, a reference numeral "102" denotes a directional coupler.

However, when the coaxial cable resonator 103 is used in the microscope, only an experiment in a microwave band can be performed due to a cut-off frequency caused by a structure of a coaxial cable. Accordingly, a resonance frequency of the near-field microscope must be limited to a specific frequency of the microwave band, whereby a limit exists in obtaining the maximum sensitivity. Also, since the coaxial cable resonator is constituted by two conductors, that is, inner and outer cylindrical conductors, only an experiment using a TEM wave can be performed. Accordingly, various wave modes for measuring various optical characteristics of the sample cannot be used in the above microscope. That is, since there exists a specific mode where an optical characteristic of a specific sample is well measured and since the coaxial cable can use only a TEM mode, the near-field microscope using the coaxial cable resonator can measure only limited kinds of samples.

Also, since the coaxial cable resonator 103 uses a frequency of a microwave band having a relatively long wavelength, its length inevitably becomes longer. That is, the coaxial cable resonator 13 inevitably has a length of about 2 m. Accordingly, a near-field optical microscope using a coaxial cable resonator is very large in volume, and is thus unsuitable for commercialization.

As another conventional near-field microscope, there is a microscope using a waveguide slit.

FIG. 2 illustrates a conventional near-field microscope using a waveguide slit, which is disclosed in "APPLIED PHYSICS LETTERS, VOLUME 77, NUMBER 1". In the microscope shown in FIG. 2, a slit 115 is formed at one end of a waveguide 113, a substrate 120 is disposed below the slit 115, a sample 117 is disposed on the substrate 120, and light is irradiated from a light source 122 positioned below substrate 120. Here, a reference numeral "123" represents a shadow mask.

In the above structure, light irradiated from the slit 115 interacts with the sample 117, and is then input through the slit 115 to the waveguide 113. A microwave deformed by an interaction with the sample 117 is detected by a detector, whereby the shape and characteristic of the sample 117 can be measured. However, the conventional near-field microscope using a waveguide slit has drawbacks in that a light loss is increased and its resolution is degraded because light having passed through the slit 115 spreads.

Even a conventional near-field microscope using a improved waveguide structure is susceptible to external environments, is large in volume, cannot be easily assembled, and cannot measure various wave modes and various samples because a device for adjusting a distance between a sample and an end of a probe is not easily installed.

SUMMARY OF THE INVENTION

The present invention provides a near-field microscope using a dielectric resonator, which makes it possible to minimize the bad influences of external environments, and to enhance its sensitivity, resolution and function by adjusting the distance between a sample and an apex of a probe.

The present invention also provides a near-field microscope using a dielectric resonator, which makes it possible to extend the range of searchable samples by optimally designing the shape of the tip in a dielectric resonator, and to adjust a frequency by installing a tuning screw on the resonator.

The present invention also provides a near-field microscope using a dielectric resonator, which makes it possible to minimize its volume, to easily adjust the distance between a probe and a sample by using the probe and a tuning fork, and to observe the sample in various directions.

According to an aspect of the present invention, there is provided a near-field microscope including: a wave source generating a wave, a frequency of the wave being adjustable by the wave source; a dielectric resonator propagating the wave from the wave source, a resonance frequency, impedance, a Q factor and an electromagnetic wave mode thereof being freely adjustable; a probe scanning the wave output from the dielectric resonator on a sample; a distance adjusting unit measuring a distance between the probe and the sample and maintaining the distance to a predetermined value; and a detector detecting a wave that propagates through the probe, interacts with the sample and then propagates through the probe and the dielectric resonator.

The near-field microscope may further include a moving unit moving a relative position between the sample and the dielectric resonator.

The wave source may generate a wave having a specific frequency, or may generate a wave spectrum having plural frequencies.

The dielectric resonator may include: a dielectric; a metal resonator surrounding the dielectric, the metal resonator being spaced apart from the dielectric by a predetermined interval; an input line supplying the wave generated by the wave source to the dielectric resonator; and an output line supplying the wave that interacts with the sample and then propagates through the probe into the dielectric resonator, to the detector.

The input line and the output line may be installed to penetrate the metal resonator, and an end portion of the input line and an end portion of the output line are positioned between the dielectric and an inner wall of the metal resonator so as to face the dielectric. Here, the end portion of the input line and the end portion of the output line each may be a straight-line type or may be bent at an angle to form a coupling loop. At this time, the resonance frequency, the impedance, the Q factor and the electromagnetic wave mode may be adjusted by rotating a first coupling loop formed at the end portion of the input line and a second coupling loop formed at the end portion of the output line.

The near-field microscope may further include a tuning unit minutely adjusting the resonance frequency and the impedance of the dielectric resonator. Here, the tuning unit may be a screw installed to penetrate the metal resonator and face the dielectric. Here, the screw may adjust the resonance frequency, the impedance, the Q factor and the electromagnetic wave mode through adjustment of its insertion depth into the dielectric resonator.

The impedance may be adjusted to be maintained at 50Ω.

The probe may be installed in such a way that one end portion thereof faces the sample and other end portion thereof penetrates the metal resonator and faces the dielectric. At this time, the other end portion of the probe may be a straight-line type or may be bent at an angle to form a coupling loop. The probe may be a hybrid-tip probe manufactured to have a body portion of a constant diameter and a rapidly tapered apex portion. Here, the probe may be made of at least one of metallic material, dielectric material and magnetic material.

The distance adjusting unit may include: a tuning fork on a surface of which the probe is attached; and a lock-in amplifier applying an AC voltage to the tuning fork and measuring a value of an output current from the tuning fork, the AC voltage having a frequency corresponding to a resonance frequency of the tuning fork. At this time, the distance between the probe and the sample may be measured using the output current value and a look-up table in which a relationship between the distance and the value of the output current is prestored. Also, the distance may be adjusted to a desired value by adjusting the output current value to a reference value through feedback between the distance and the output current value.

The detector may include: a power meter measuring the intensity of the wave that interacts with the sample and then propagates through the probe and the dielectric resonator; and a spectrum analyzer measuring a frequency of the wave that interacts with the sample and then propagates through the probe and the dielectric resonator. At this time, the detector may further include a network analyzer measuring an insertion loss and a matching state of the dielectric resonator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
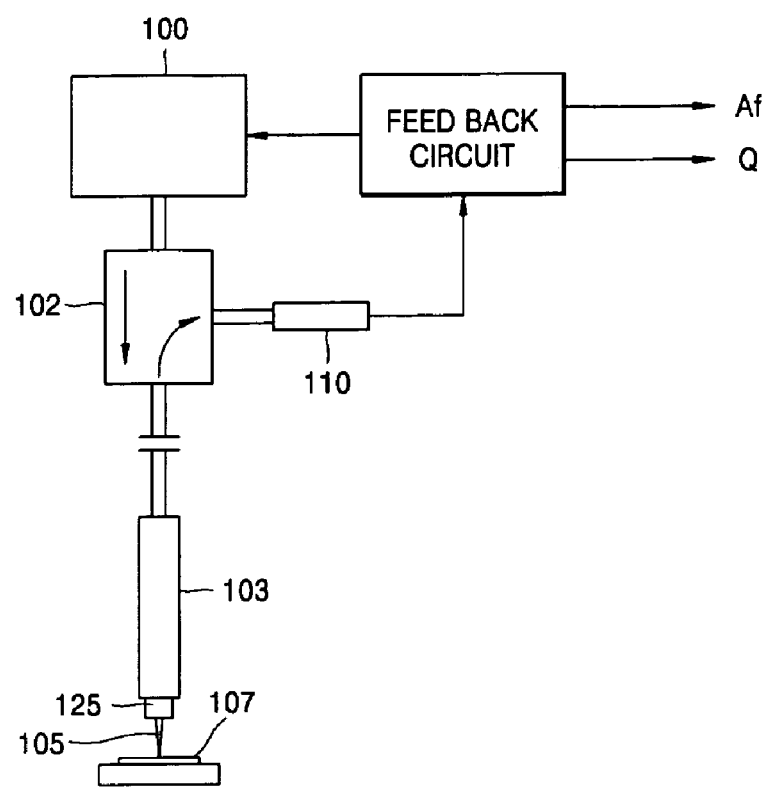
FIG. 1 is a diagram illustrating a conventional near-field microscope using a coaxial cable.
Figure 2:
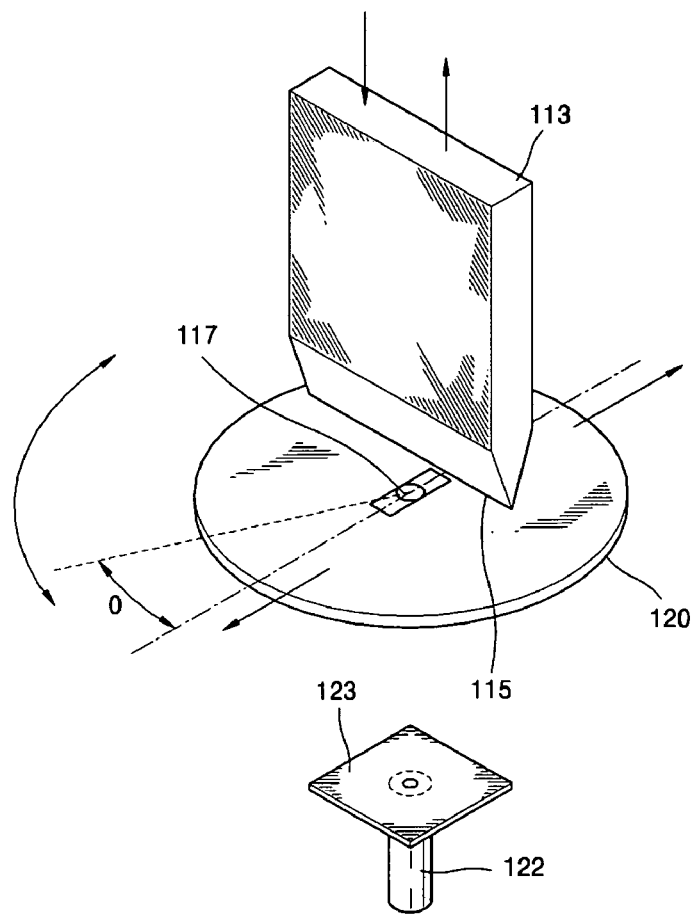
FIG. 2 is a schematic diagram illustrating a conventional near-field microscope using a waveguide having a slit formed at one end thereof.
Figure 3:
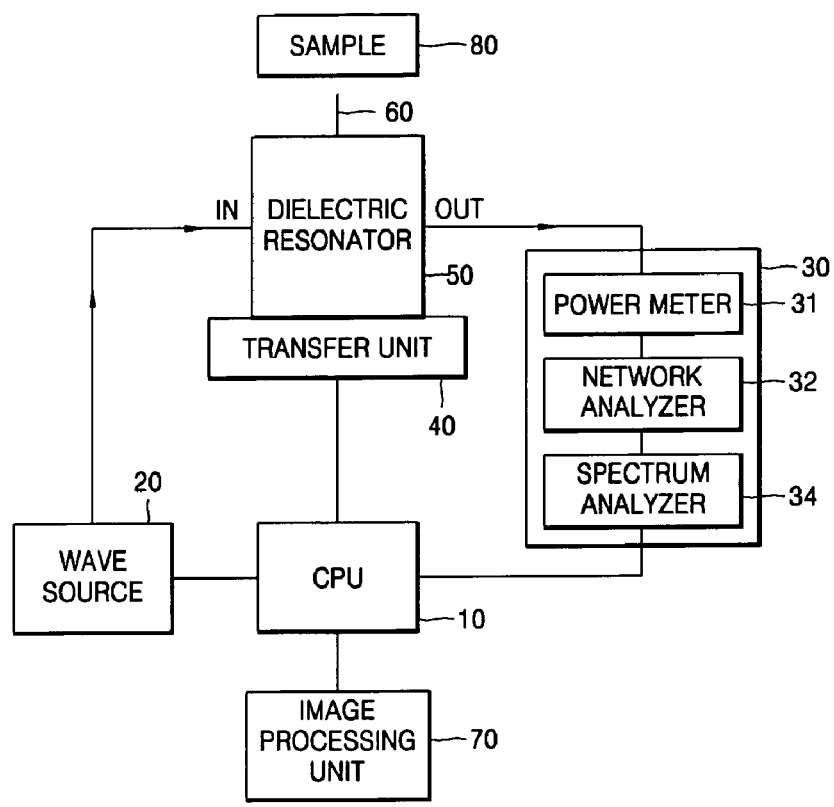
FIG. 3 is a schematic block diagram of a near-field microscope using a dielectric resonator according to the present invention.

FIG. 3 is a schematic block diagram of a near-field microscope using a dielectric resonator according to an embodiment of the present invention.

Referring to FIG. 3, the inventive near-field microscope includes a central processing unit 10, a wave source 20, a detector 30, a dielectric resonator moving unit 40, a dielectric resonator 50, a probe 60, and an image processing unit 70.

As aforementioned, the conventional near-field microscope using a coaxial cable resonator has a problem in that searchable samples are limited in type or scope, because it can use only a TEM mode. Also, the conventional near-field microscope using a waveguide slit has a problem in that its resolution is degraded. Accordingly, the inventive near-field microscope uses a dielectric resonator to solve the above problems of the conventional art.

Figure 4A:
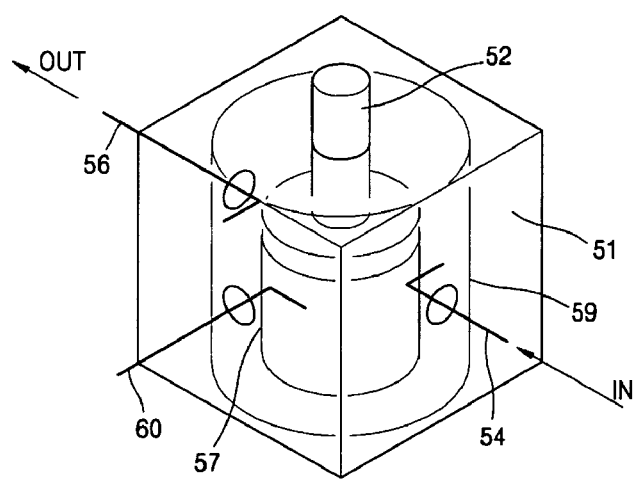
FIGS. 4A through 4C illustrates a structure of a dielectric resonator used in the near-field microscope shown in FIG. 3.
Figure 4B:
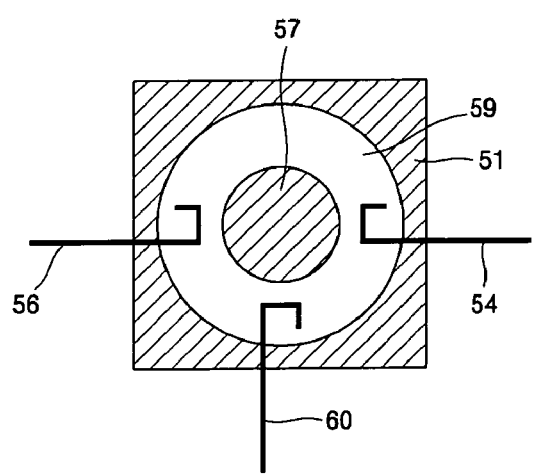
Figure 4C:
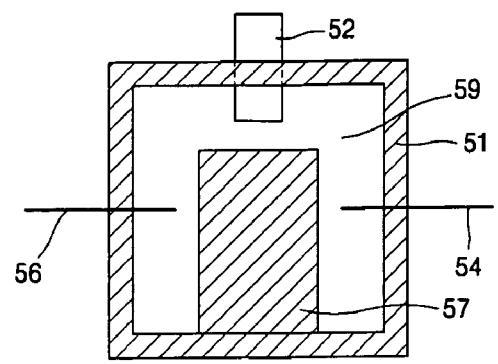

FIGS. 4A through 4C illustrates a structure of the dielectric resonator 50 used in the near-field microscope shown in FIG. 3.

FIG. 4A is a perspective view of the dielectric resonator 50 according to an embodiment of the present invention.

Referring to FIG. 4A, the dielectric resonator 50 includes a dielectric 57, a metal resonator 51 surrounding the dielectric 57, an input line 54 for supplying a wave generated by the wave source to the inside of the dielectric resonator 50, an output line 56 for transmitting a wave, which interacts with the sample 80 and then propagates through the probe 60 into the dielectric resonator 50, to the detector 30, and a tuning screw 52 installed to penetrate an upper surface of the metal resonator 51 and faces an upper surface of the dielectric 57. Here, the dielectric 57 may be any type of dielectric. An inner cylindrical cavity 59 is formed in the metal resonator 51, and the dielectric 57 is provided in the cavity 59. The metal resonator 51 is preferably made of high conductive metal such as silver (Ag), or may be made by coating a metal frame with silver.

FIG. 4B is a horizontal sectional view of the dielectric resonator 50 shown in FIG. 4A.

Referring to FIG. 4B, a cylindrical dielectric 57 is fixed in the cavity 59 of the metal resonator 51. At this time, a predetermined interval must be formed between an inner wall of the metal resonator 51 and the cylindrical dielectric 57 so that end portions of the input line 54 and the output line 56 and the probe 60 can be positioned in the predetermined interval. As shown in FIG. 4B, the input line 54, the output line 56 and the probe 60 are installed to penetrate the metal resonator 51, and their end portions are positioned in the predetermined interval to face the cylindrical electric 57. Here, the end portions may be a straight-line type, or are preferably bent at an angle to form a coupling loop so that a characteristic of the dielectric resonator 50 can be suitably adjusted by adjusting a relative angle of the coupling loop.

FIG. 4C is a vertical sectional view of the dielectric resonator 50 shown in FIG. 4A.

Referring to FIG. 4C, the tuning screw 52 penetrates an upper surface of the metal resonator 51 and is installed to face an upper surface of the dielectric 57. A characteristic of the dielectric resonator 50 can also be suitably adjusted by adjusting an interval between the tuning screw 52 and the dielectric 57.

An electromagnetic field in the dielectric resonator 50 is changed according to resonance modes, and thus a power transmission characteristic and a resonance frequency of the dielectric resonator 50 are also changed. Therefore, it is important to classify modes of the resonance frequency. For this purpose, a characteristic of the dielectric resonator 50 has been ascertained through the following simulation. The simulation has been performed using an Ansoft HFSS (high frequency structure simulator). The simulation has been performed in a range of 4 through 6 GHz through a fast frequency sweep solution so as to ascertain a change in the resonance frequency and the resonance mode according to the relative angles of the coupling loop. In this simulation, the dielectric 57 has a relative dielectric constant of 29, a diameter of 14 mm, and a height of 5.8 mm. The results of the simulation are illustrated in FIGS. 5 through 7.

FIGS. 5A through 5D respectively illustrate a perspective view, a frequency characteristic graph and electric/magnetic field distribution diagrams of a dielectric resonator to which a coupling loop is horizontally coupled.

Figure 5A:
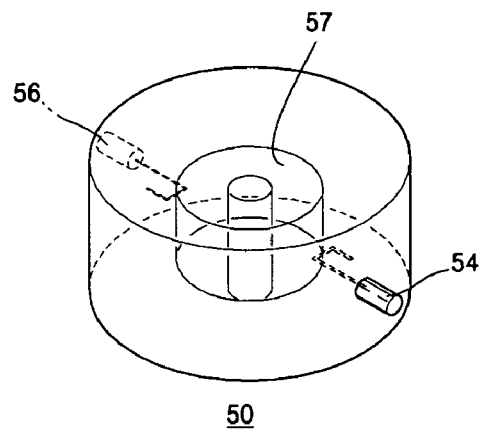
FIGS. 5A through 5D respectively illustrate a perspective view, a frequency characteristic graph and electric/magnetic field distribution diagrams of a dielectric resonator to which a coupling loop is horizontally coupled.
Figure 5B:
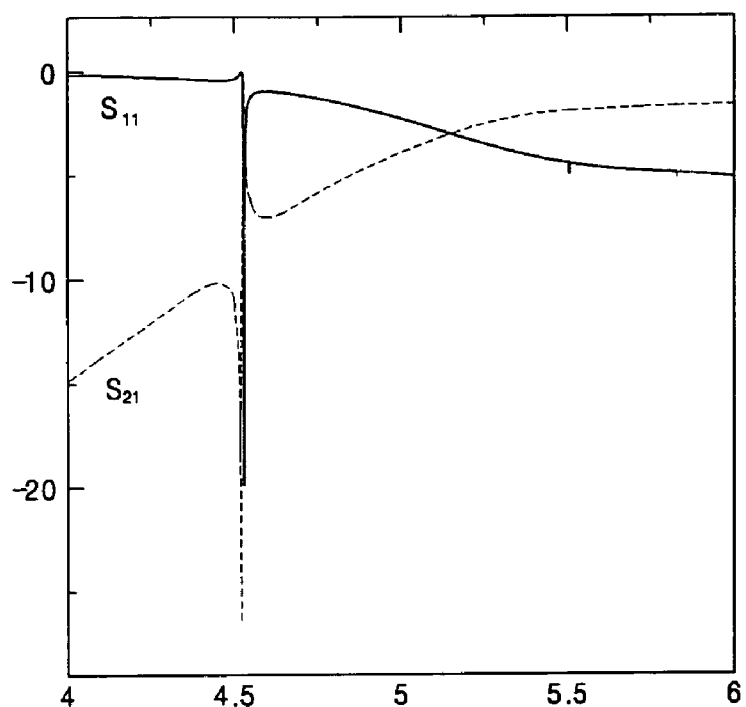
Figure 5C:
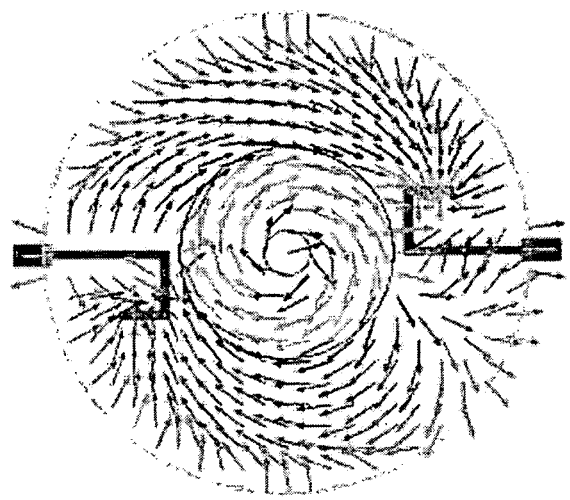
Figure 5D:
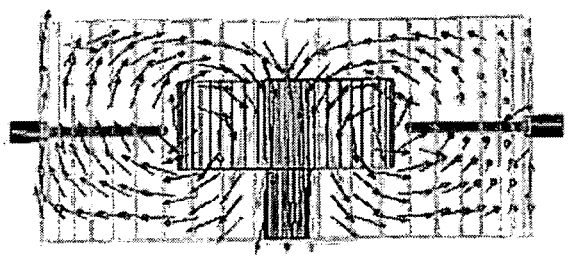

When the coupling loop is horizontally coupled to the dielectric resonator 50 as shown in FIG. 5A, a resonance frequency of the dielectric resonator 50 is 4.5 GHz as shown in FIG. 5B. The electric field distribution and the magnetic field distribution in the dielectric resonator 50 in the case of the resonance frequency of 4.5 GHz are respectively illustrated in FIGS. 5C and 5D. It can be known from the HFSS simulation that the resonance frequency of the dielectric resonator 50 is 4.5 GHz and a TE01 mode is excited when the coupling loop is horizontally coupled to the dielectric resonator 50.

FIGS. 6A through 6D respectively illustrate a perspective view, a frequency characteristic graph and electric/magnetic field distribution diagrams of a dielectric resonator to which a coupling loop is vertically coupled.

Figure 6A:
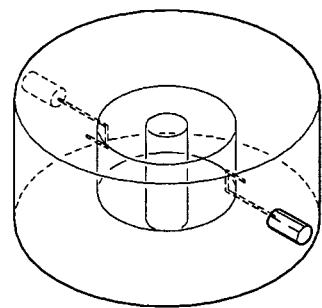
FIGS. 6A through 6D respectively illustrate a perspective view, a frequency characteristic graph and electric/magnetic field distribution diagrams of a dielectric resonator to which a coupling loop is vertically coupled.
Figure 6B:
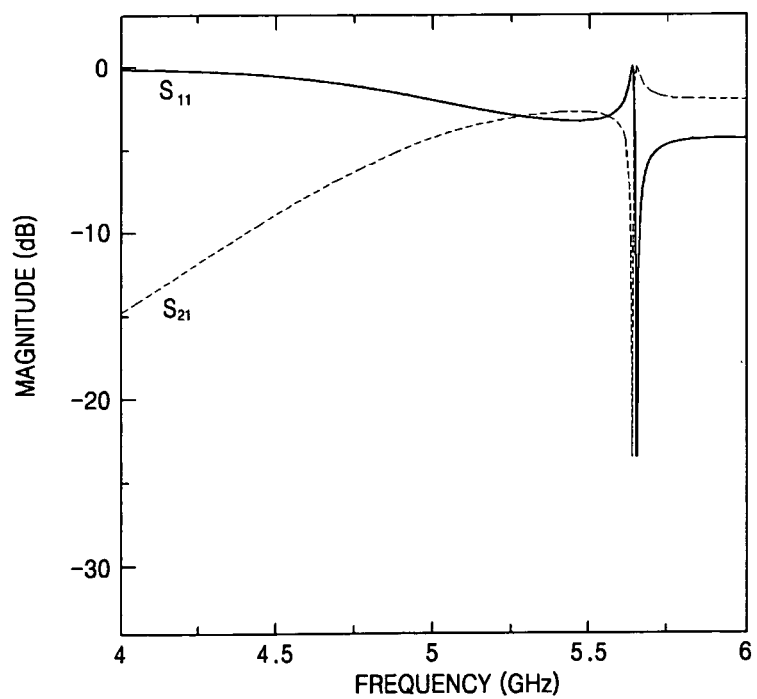
Figure 6C:
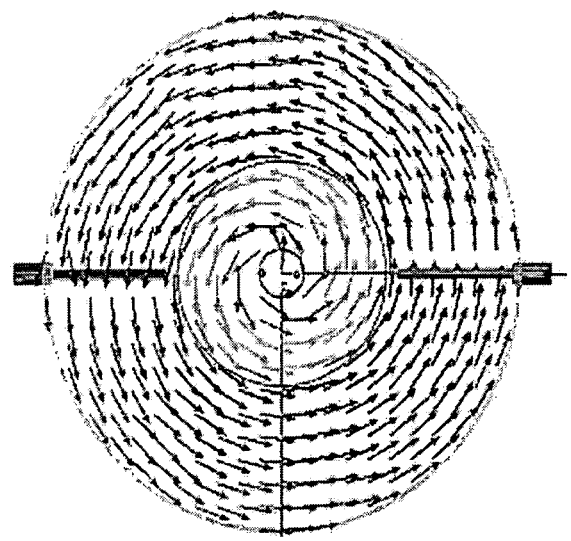
Figure 6D:
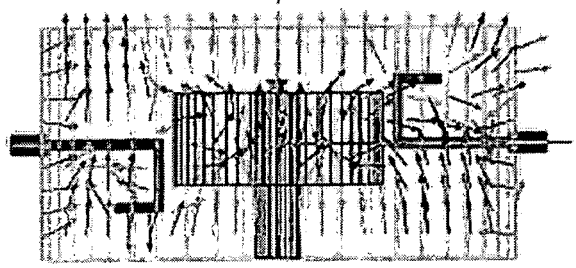

When the coupling loop is vertically coupled to the dielectric resonator 50 as shown in FIG. 6A, a resonance frequency of the dielectric resonator 50 is 5.6 GHz as shown in FIG. 6B. The electric field distribution and the magnetic field distribution in the dielectric resonator 50 in the case of the resonance frequency of 5.6 GHz are respectively illustrated in FIGS. 6C and 6D. It can be known from the HFSS simulation that the resonance frequency of the dielectric resonator 50 is 5.6 GHz and a TM01 mode is excited when the coupling loop is vertically coupled to the dielectric resonator 50.

FIGS. 7A through 7F respectively illustrate a perspective view, a frequency characteristic graph and electric/magnetic field distribution diagrams of a dielectric resonator to which a coupling loop is coupled 45° diagonally.

Figure 7A:
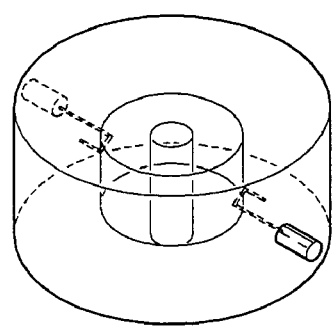
FIGS. 7A through 7F respectively illustrate a perspective view, a frequency characteristic graph and electric/magnetic field distribution diagrams of a dielectric resonator to which a coupling loop is coupled 45° diagonally.
Figure 7B:
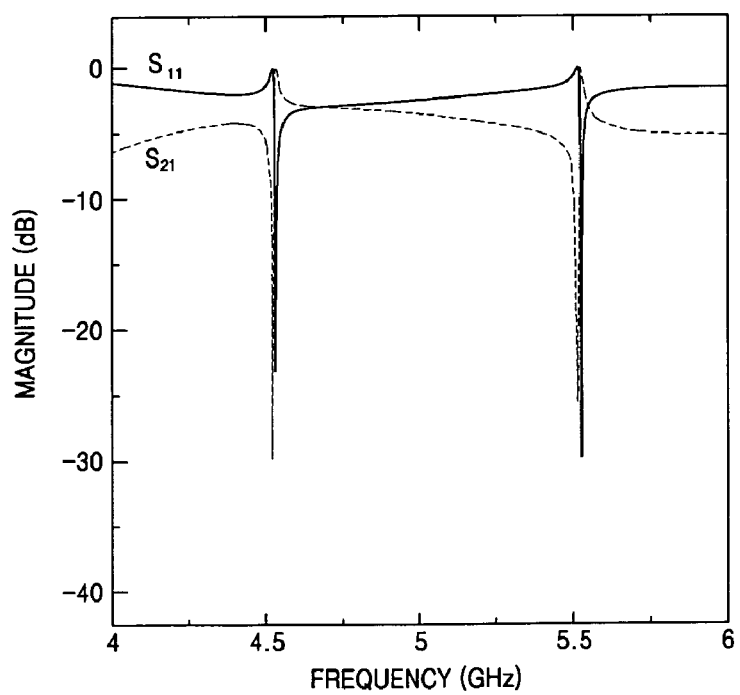
Figure 7C:
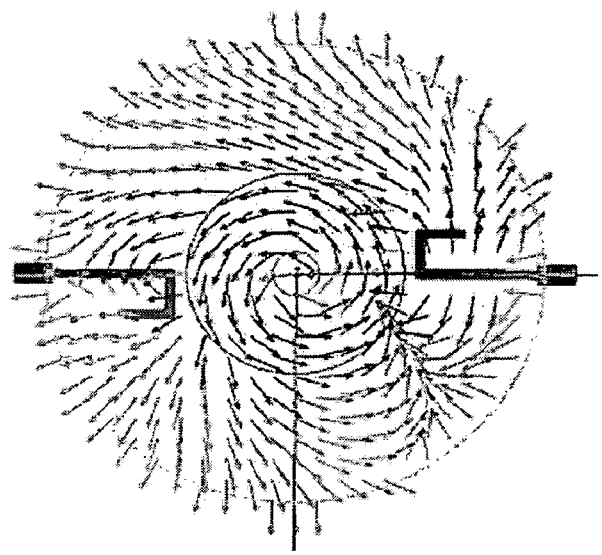
Figure 7D:
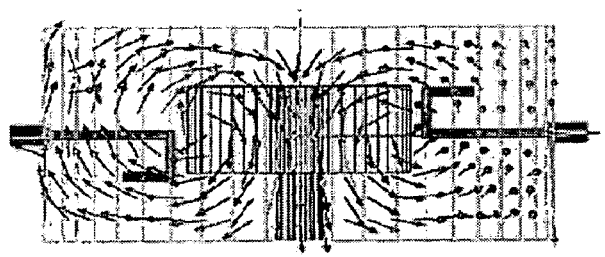
Figure 7E:
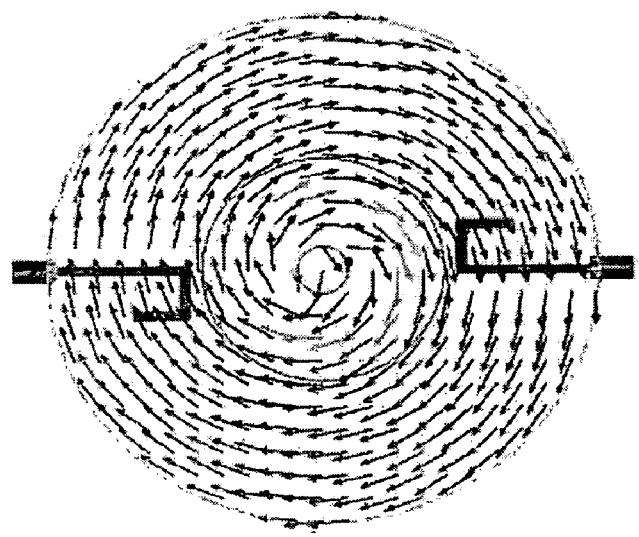
Figure 7F:
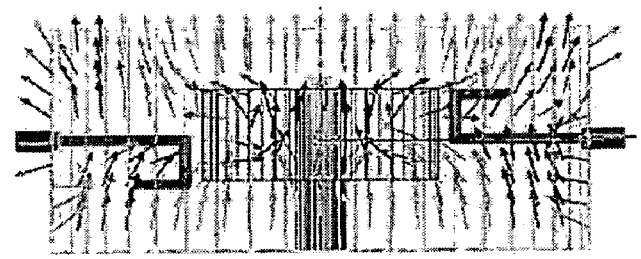

When the coupling loop is 45°-diagonally coupled to the dielectric resonator 50 as shown in FIG. 7A, the dielectric resonator 50 resonates at 4.5 GHz and at 5.6 GHz as shown in FIG. 7B. The electric field distribution and the magnetic field distribution in the dielectric resonator 50 in the case of the resonance frequency of 4.5 GHz are respectively illustrated in FIGS. 7C and 7D, and the electric field distribution and the magnetic field distribution in the dielectric resonator 50 in the case of the resonance frequency of 5.6 GHz are respectively illustrated in FIGS. 7E and 7F. It can be known from FIGS. 7C through 7F that a TE01 mode is excited in the case of the resonance frequency of 4.5 GHz and a TM01 mode is excited in the case of the resonance frequency of 5.6 GHz.

As known from the above simulation, a TE mode and a RM mode can be selectively excited according to the relative angles of the coupling loop. This is because a specific mode is strongly or weakly excited due to changes in electric and magnetic flux crossing a section of the coupling loop according to the relative angles of the coupling loop. Accordingly, unlike the conventional near-field microscope, the inventive near-field microscope makes it possible to select a desired mode, thereby increasing the type and scope of searchable samples.

Figure 8A:
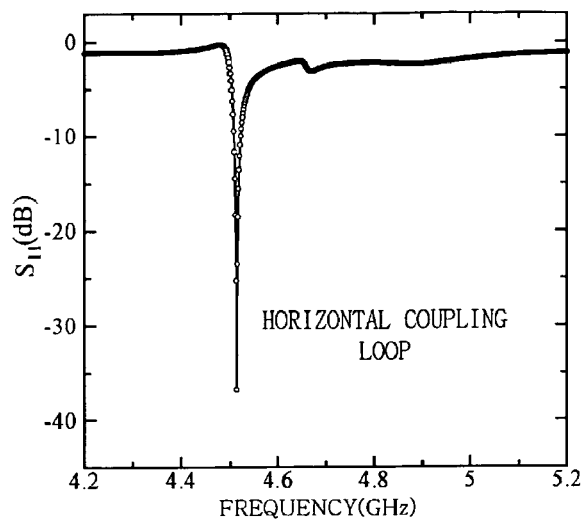
FIGS. 8A through 8C respectively illustrate frequency characteristic graphs of a dielectric resonator to which a coupling loop is coupled horizontally, vertically or 45° diagonally.
Figure 8B:
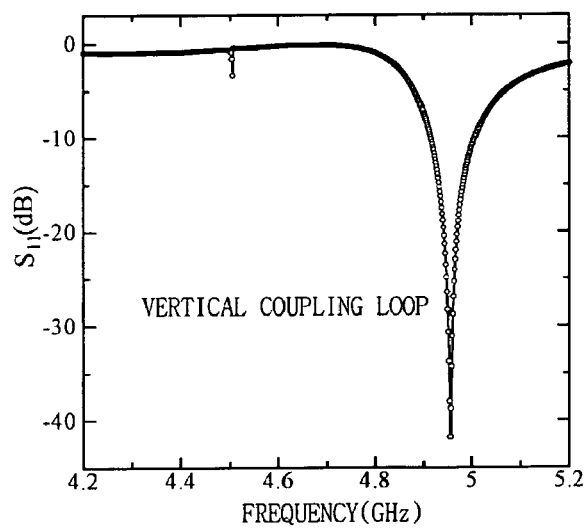
Figure 8C:
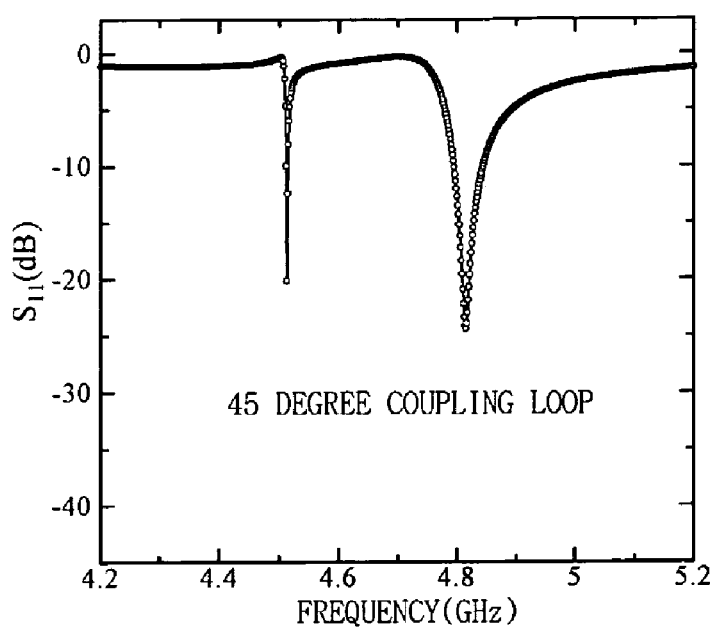

To identify the result of the above simulation, an experiment has been performed using a dielectric resonator made of Ba(ZrTa)O$_3$ having a relative dielectric constant of 29. In the experiment, the dielectric resonator is manufactured to have an inner diameter of 2 mm, an outer diameter of 14 mm, and a height of 5.8 mm, and the metal resonator surrounding the dielectric resonator is manufactured to have a radius of 32 mm and a height of 14 mm. The result of the experiment is illustrated in FIG. 8. FIGS. 8A illustrates a frequency characteristic graph of the dielectric resonator to which the coupling loop is horizontally coupled. When the coupling loop is horizontally coupled to the dielectric resonator, a TE01 mode has a resonance frequency of 4.5 GHz as shown in FIG. 8A, which is nearly identical to the resonance frequency in the HFSS simulation. At this time, an unloaded Q factor "$Q_U$" of the dielectric resonator at the resonance frequency is 24,000. A loaded Q factor "$Q_L$" of the dielectric resonator can be obtained by taking a width (Δf) of a frequency curve 3 dB below from a resonance frequency obtained by the network analyzer 32. The unloaded Q factor "$Q_U$" of the dielectric resonator can be expressed as Equation 1 below.

$$Q_U = \frac{Q_L}{(1 - 10^{-loss/20})} \qquad \text{[Equation 1]}$$

where "loss" is an insertion loss of the resonator.

Here, the insertion loss can be measured at the network analyzer such as "Agilent 8753ES". In addition, FIGS. 8B and 8C respectively illustrate frequency characteristic graphs of the dielectric resonator to which the coupling loop is coupled vertically or 45° diagonally.

Meanwhile, as aforementioned, the characteristics of the dielectric resonator 50, such as a resonance frequency, a Q factor, and impedance can be adjusted by adjusting the interval between the tuning screw 52 and the dielectric 57.

Figure 9A:
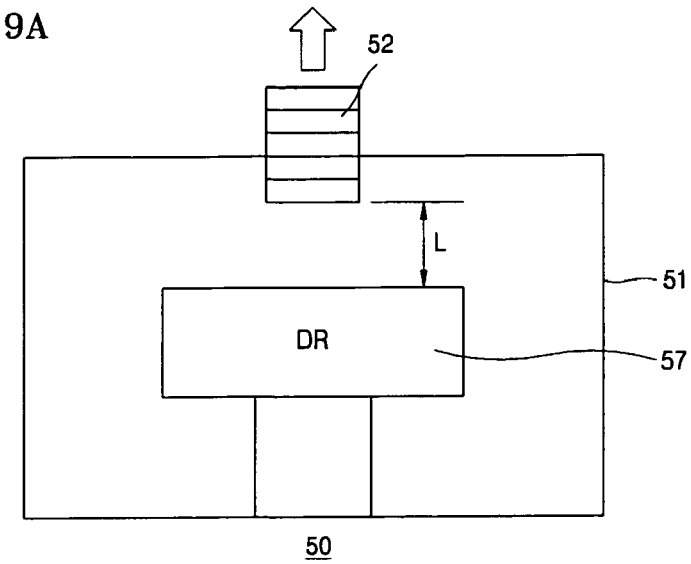
FIG. 9A illustrates a distance L between a tuning screw and a dielectric.
Figure 9B:
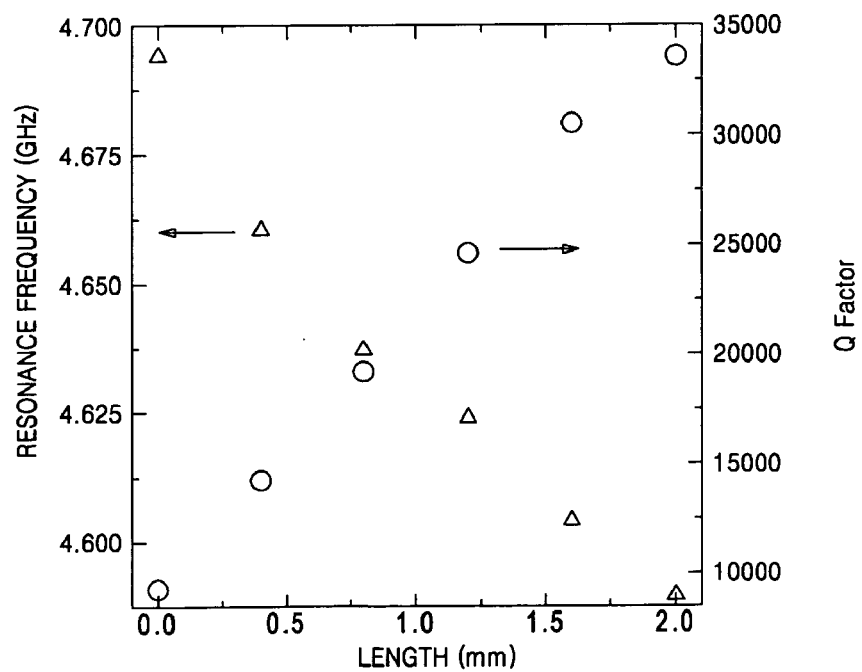
FIG. 9B is a graph illustrating a change in a resonance frequency or a Q factor of a dielectric resonator according to a change in a distance L between a tuning screw and a dielectric.

FIG. 9A illustrates the interval "L" between the tuning screw and the dielectric, and FIG. 9B is a graph illustrating a change in a resonance frequency or a Q factor of the dielectric resonator according to a change in a distance "L" between the tuning screw and the dielectric.

Referring to FIG. 9B, as the tuning screw 52 is extracted from the metal resonator 51, the resonance frequency is decreased from 4.7 GHz to 4.6 GHz and the Q factor is increased from 1,0000 to 35,000. This is because electric and magnetic fields stored in the resonator is changed due to a change in the inner volume of the resonator according to perturbation theory when the tuning screw is extracted from the resonator. Specifically, the resonance frequency is decreased because electric field energy is generated more than magnetic field energy, in a space generated when the tuning screw 52 is extracted from the dielectric resonator 50.

Accordingly, the performance of the inventive near-field microscope can be optimized by adjusting the characteristic of the dielectric resonator 50 more minutely using the tuning screw 52. In general, the performance of a near-field resonator depends on how an external circuit is coupled to a resonator. The external circuit is coupled to the resonator through a coupling loop, and the performance of the near-field resonator is determined from a distance between the coupling loop and a dielectric resonator and a cross section of the coupling loop. This is because the performance of the near-field resonator depends on the amount of electric and magnetic flux crossing a section of the coupling loop. Here, the resonator must be matched to the external circuit in the resonance frequency so as to be able to maximally transmit power from the external circuit to the resonator. It is called that the resonator is critically coupled to the external circuit when the resonator matches to the external circuit.

A coupling coefficient between the resonator and a transmission line must be "1" so that the resonator can be critically coupled to the external circuit. The coupling coefficient can be expressed as Equation 2 below.

$$\kappa = \frac{Z_r}{Z_0} \qquad \text{[Equation 2]}$$

where $Z_o$ is the impedance of the resonator and the $Z_r$ is the impedance of the transmission line.

That is, the impedance of the resonator must be identical to that of the transmission line so that the resonator can be critically coupled to the external circuit. In the inventive near-field microscope, the input line 54, the output line 56 and the probe 60 correspond to the transmission line. In general, the impedance of the transmission line is set to 50Ω. Accordingly, the inventive near-field microscope has an optimal performance when the impedance $Z_r$ of the dielectric resonator 50 is also 50Ω. When the impedance $Z_r$ of the dielectric resonator 50 is not 50Ω, power cannot be maximally transmitted from the external circuit to the dielectric resonator 50 because a signal is reflected between the dielectric resonator 50 and the transmission line.

As aforementioned, the present invention can adjust the impedance of the dielectric resonator 50 to "50Ω" by using the tuning screw 52. At this time, in order to optimally maintain the performance of the near-field microscope, the impedance of the dielectric resonator 50 must be maintained to "50Ω" not only when the sample is not present but also when the probe 60 is approached to the sample 80.

Figure 10A:
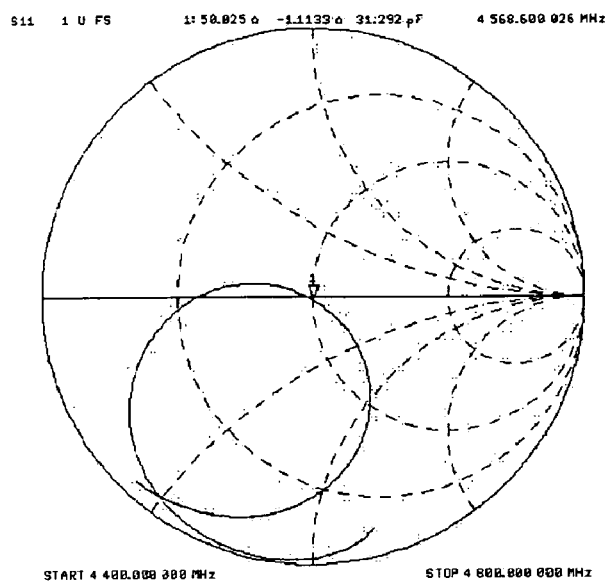
FIG. 10A is a Smith chart where the impedance of a dielectric resonator is adjusted to 50Ω using a tuning screw when no sample is present.
Figure 10B:
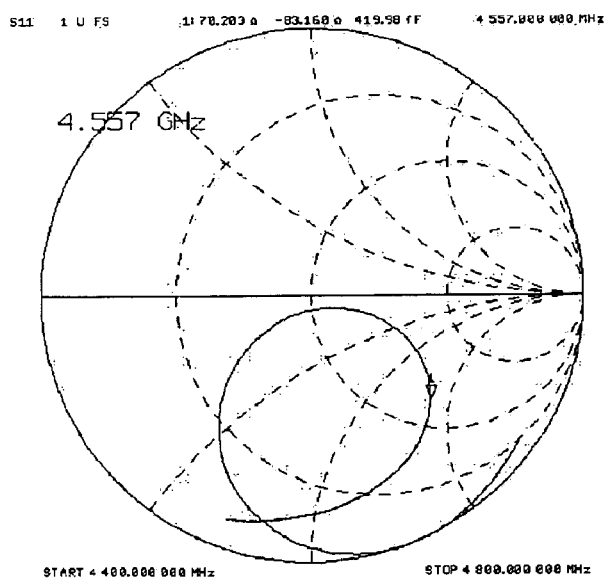
FIG. 10B is a Smith chart where a probe is approached to a sample.

FIG. 10A is a Smith chart where the impedance of the dielectric resonator 50 is adjusted to 50Ω using the tuning screw 52 when no sample is present, and FIG. 10B is a Smith chart where the probe 60 is approached at a distance of 1 μm from the sample 80. As shown in FIGS. 10A and 10B, when the probe 60 is approached to the sample 80, the resonance frequency and the Q factor are all decreased due to an interaction between the probe 60 and the sample 80. At this time, the resonance frequency becomes 4.557 GHz, the Q factor becomes 980, and the impedance of the resonator becomes 70.2Ω. Accordingly, the characteristic of the resonator needs to be adjusted to increase the sensitivity of the resonator.

Figure 10C:
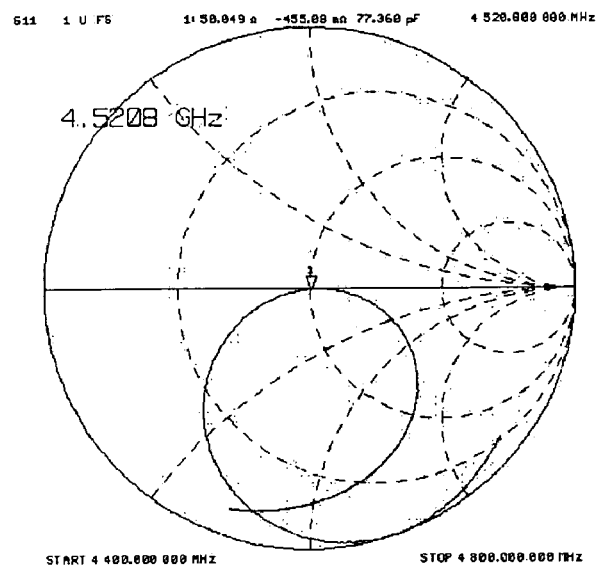
FIG. 10C is a Smith chart where the impedance of a dielectric resonator is readjusted to 50Ω.

FIG. 10C is a Smith chart where the impedance of the dielectric resonator is readjusted to 50Ω using tuning screw 52. As shown in FIG. 10C, the Q factor of the resonator can be again increased to 22,000 using the tuning screw 52. At this time, the resonance frequency is 4.5208 GHz.

Figure 10D:
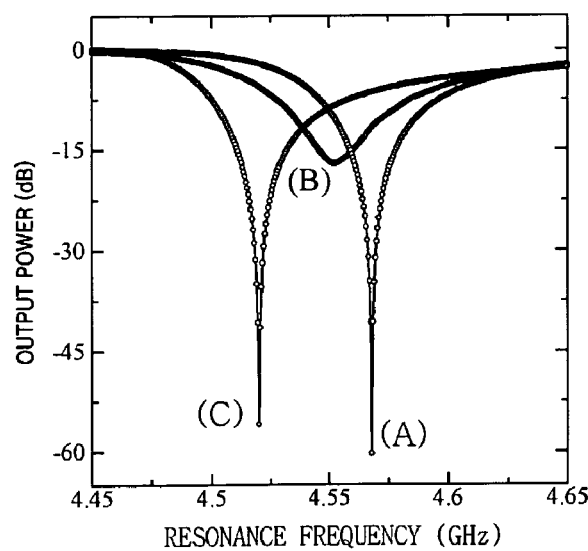
FIG. 10D is a graph illustrating changes in resonance frequencies in FIGS. 10A through 10C.

FIG. 10D is a resonance frequency characteristic graph corresponding to Smith charts in FIGS. 10A through 10C. Here, the characteristics of the dielectric resonator 50, such as impedance and a resonance frequency, can be measured using the network analyzer 32 of the detector 30.

Meanwhile, the sensitivity of the inventive near-field scanning microwave microscope is influenced not only by the Q factor of the resonator but also by the geometrical shape of the probe 60. Also, the spatial resolution of the near-field microscope is directly influenced by a curvature radius of an end portion of the probe 60. Accordingly, a research on a probe is essential for enhancing the sensitivity and spatial resolution of the near-field microscope. In general, an interaction between the apex of the probe 60 and the sample 80 can be known from an electric dipole theory.

Figure 11:
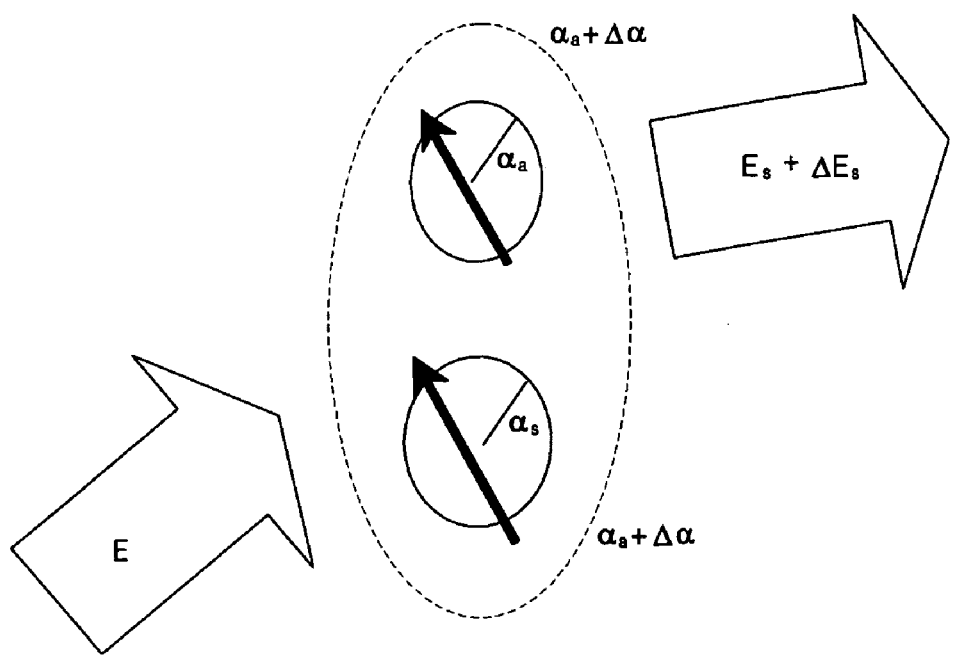
FIG. 11 is a diagram illustrating an interaction between a sample and the apex of a probe.

FIG. 11 is a diagram illustrating an interaction between the sample and the apex of a probe. In FIG. 11, it is assumed that the apex of the probe 60 and the sample 80 are respectively spheres respectively having radii of $a_a$ and $a_s$. When two dipoles respectively have polarizabilities of $\alpha_a$ and $\alpha_s$ due to an external electric field, the polarizability after perturbation due to dipole-dipole coupling can be expressed as Equation 3 below.

$$\Delta \alpha = \frac{\alpha_a \alpha_s}{R^3} \quad \text{[Equation 3]}$$

where "R" is a distance between two dipole spheres.

At this time, the polarizability can be expressed as Equation 4 below.

$$\alpha_i = \frac{\left(\frac{\varepsilon}{\varepsilon_o} - 1\right)}{\left(\frac{\varepsilon}{\varepsilon_o} + 2\right)} a_i^3 \quad \text{[Equation 4]}$$

where "i" may be "a" or "s", "a" indicates the apex of the probe, and "s" indicates the sample.

Here, the strength of an electric field can be expressed as Equation 5 below.

$$|E_s + \Delta E_s|^2 \propto [(\alpha_a + \Delta\alpha) + (\alpha_s + \Delta\alpha)]^2 |E|^2$$

$$|E_s|^2 \propto (\alpha_a + \alpha_s)^2 |E|^2 \quad \text{[Equation 5]}$$

where "$E_s + \Delta E_s$" and "$E_s$" respectively indicate electric fields after and before the perturbation.

Also, a change in the resonance frequency can be expressed as Equation 6 using a difference between electric field energy before the perturbation and electric field energy after the perturbation.

$$\frac{\Delta \omega}{\omega} = \frac{|E_s + \Delta E_s|^2 - |E_s|^2}{|E_s|^2} \quad \text{[Equation 6]}$$

$$= \frac{[(\alpha_a + \Delta\alpha) + (\alpha_s + \Delta\alpha)]^2 |E|^2 - (\alpha_a + \alpha_s)^2 |E|^2}{(\alpha_a + \alpha_s)^2 |E|^2}$$

$$= \frac{4\Delta\alpha}{(\alpha_a + \alpha_s)}$$

This can be summarized as Equation 7 below.

$$\frac{\Delta \omega}{\omega} = \frac{4}{R^3} \left( \frac{\alpha_a \alpha_s}{\alpha_a + \alpha_s} \right) \quad \text{[Equation 7]}$$

As known from the equations, in the near-field scanning microwave microscope using a dipole-dipole interaction, the resolution is enhanced as the curvature radius of the apex of the probe is decreased. However, the sensitivity is enhanced as a distance between the probe and the sample is decreased and the polarizability is increased. Since the polarizability is increased when the effective area of the probe and the sample is large, the sensitivity is enhanced when the curvature radius of the apex of the probe is large. Accordingly, when the apex of the probe is small, the resolution is enhanced but the sensitivity is degraded. Therefore, the probe must be suitably selected so as to obtain suitably good resolution and sensitivity. If possible, it is advantageous to increase the effective area of the probe while reducing the curvature radius of the apex of the probe.

Figure 12A:
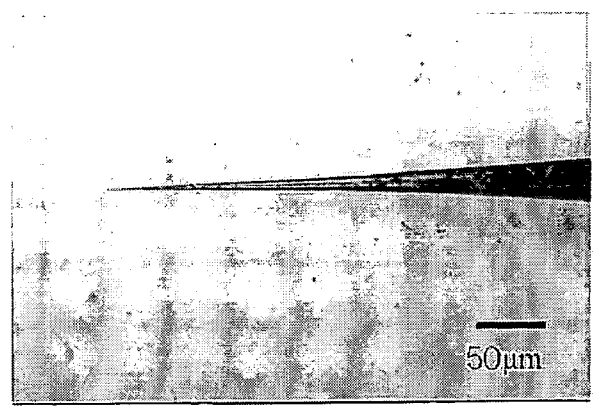
FIGS. 12A through 12F illustrate the sensitivity and spatial resolution of a near-field scanning microwave microscope according to the shape of a probe.
Figure 12B:
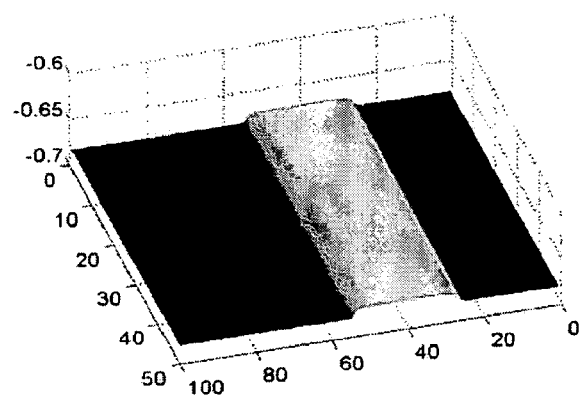
Figure 12C:
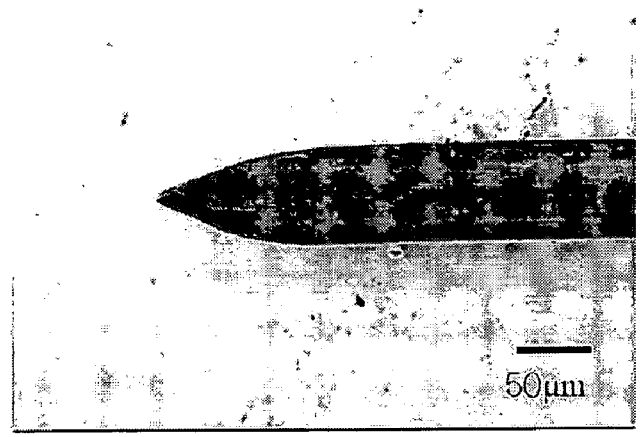
Figure 12D:
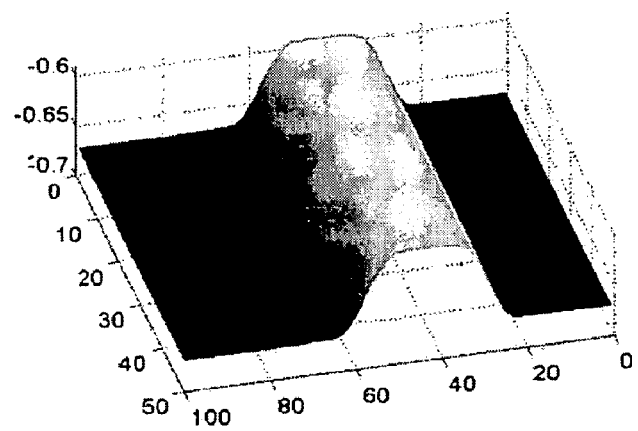
Figure 12E:
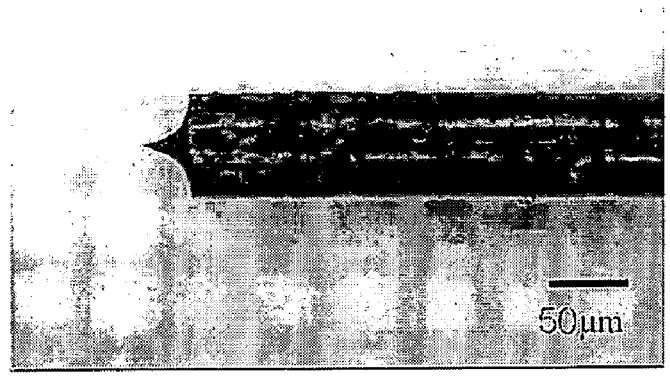
Figure 12F:
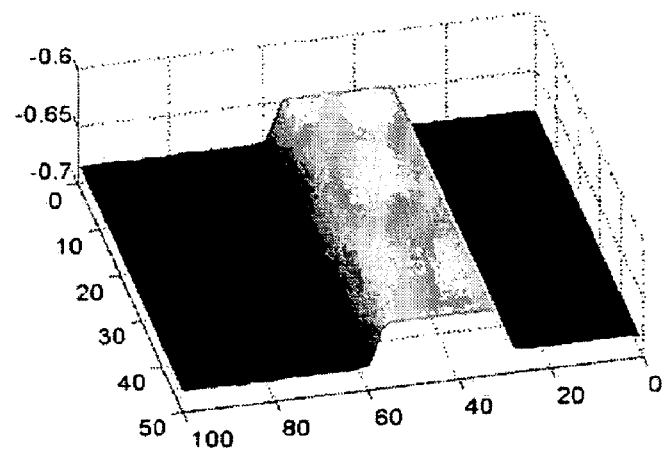

FIGS. 12A through 12F illustrate the sensitivity and spatial resolution of the near-field scanning microwave microscope according to the shapes of the probe. FIG. 12A illustrates the shape of a thin-tip probe, and the FIG. 12B is a graph illustrating a case where a chrome line having a width of 27 μm is scanned using the thin-tip probe. In FIG. 12B, a vertical axis corresponds to the sensitivity and the horizontal axis corresponds to the resolution. FIG. 12C illustrates the shape of a thick-tip probe, and the FIG. 12D is a graph illustrating a case where a chrome line having a width of 27 μm is scanned using the thick-tip probe. FIG. 12E illustrates the shape of an inventive hybrid-tip probe, and the FIG. 12F is a graph illustrating a case where a chrome line having a width of 27 μm is scanned using the hybrid-tip probe. The above probes are manufactured through chemical etching. Here, an etching solution is a solution where 10 wt % KOH is dissolved in distilled water. A completed metal probe is cleaned using distilled water and absolute alcohol. The thick-tip probe and the thin-tip probe are manufactured by adjusting the etching time thereof. The hybrid-tip probe is manufactured by wrapping the center portion of a probe with Teflon and then etching the wrapped probe. Here, the probe may be made of metallic, dielectric or magnetic material.

As aforementioned, when the curvature radius of the apex of the probe is increased, the sensitivity is increased due to an increased interactive area between the probe and the sample. Also, as the probe is thicker, more electric fields are transmitted from the resonator to the probe. However, since the resolution of the near-field scanning microwave microscope is increased as the curvature radius of the probe is decreased, the probe must be reduced in size. The thin-tip probe is enhanced in spatial resolution but is degraded in sensitivity as shown in FIGS. 12A and 12B. On the contrary, the thick-tip probe is degraded in spatial resolution but is enhanced in sensitivity as shown in FIGS. 12C and 12D. Accordingly, the present invention develops the hybrid-tip probe having the advantages of the thin-tip and thick-tip probes so as to enhance the spatial resolution and sensitivity of the near-field scanning microwave microscope. As shown in FIG. 12E, the hybrid-tip probe is manufactured to have an apex portion of a 1 through 10-μm curvature radius (like the thin-tip probe) and a body portion of a 1-mm thickness (like the thick-tip probe). In this case, the spatial resolution and sensitivity of the near-field scanning microwave microscope can be adjusted to suitable (trade-off) levels and an image of the best contrast can be obtained as shown in FIG. 12F.

A method for minutely adjusting a distance between the probe and the sample will now be described in detail.

The probe 60 together with the dielectric resonator 50 is approached vertically or horizontally to a desired portion of the sample 80 by the moving unit 40. At this time, the highest sensitivity can be achieved when the probe 60 is maximally approached to the sample 80 without being brought into contact with the sample 80. For this purpose, a distance adjusting unit for maintaining a desired distance between the probe 60 and the sample 80 is required.

Figure 13:
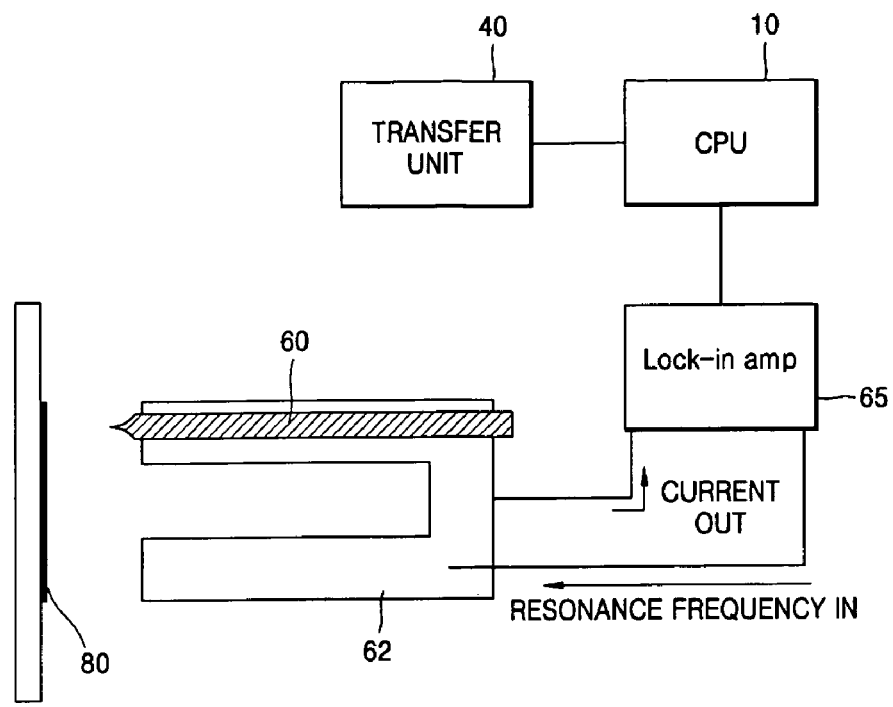
FIG. 13 illustrates a distance adjusting unit for adjusting a distance between a probe and a sample according to the present invention.

FIG. 13 illustrates a distance adjusting unit for adjusting a distance between a probe and a sample according to an embodiment of the present invention.

Referring to FIG. 13, the distance adjusting unit includes a tuning fork 62 on one side surface of which the probe 60 is attached, and a lock-in amplifier 65 for applying an AC voltage, which has a frequency corresponding to a natural frequency of the tuning fork 62, to the tuning fork 62 and measuring an output current from the tuning fork 62. The distance adjusting unit uses a phenomenon where a frequency of the tuning fork 62 is changed due to an interaction between the probe 62 and the sample 80 when the tuning fork 62 having the probe 60 is approached to the sample 80. That is, when the probe 60 attached to the tuning fork 62 having a natural frequency is approached to a surface of the sample 80, a resonance frequency of the tuning fork 62 is increased due to a shear force between the probe 60 and the surface of the sample 80. In this case, when the resonance frequency of the tuning fork 62 is made to be constant through a feedback operation, the distance between the probe 60 and the sample 80 can be maintained to be several nanometers.

An operational principle of the distance adjusting unit will now be described in detail by the result of an experiment.

In the experiment, a metal probe etched in the shape shown in FIG. 12E is attached on one side surface of the tuning fork 62. Thereafter, an AC voltage of 0.05V is applied to the tuning fork 62 through an OSC out port of a 7265 DSP lock-in amplifier (Eg&G Corporation), and a current output from the tuning fork 62 is measured through a line-in port. Here, a natural frequency of the tuning fork 62 is 32,768 Hz, and the metal probe is manufactured by etching an 0.05-mm SUS line (Nilaco Corporation).

At this time, measured values of signals output from the tuning fork 62 with respect to respective frequencies is expressed by a Lorenzian function having a maximum current at a resonance frequency. In general, when a probe is attached to a tuning fork, a natural frequency of the tuning fork is decreased below 32,758 Hz and a Q factor is also decreased because the effective mass of the tuning fork is increased.

Figure 14:
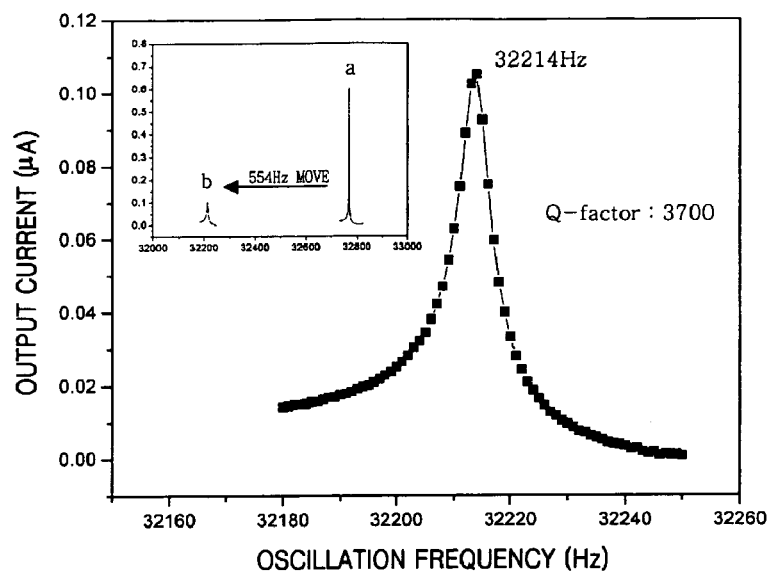
FIG. 14 is a graph illustrating a resonance characteristic of an output current from a tuning pork on which a probe is attached, with respect to a frequency of an input current to the tuning pork.

FIG. 14 is a graph illustrating a resonance characteristic of an output current from a tuning pork having the probe attached thereto, with respect to a frequency of an input voltage to the tuning pork.

As known from the graph shown in FIG. 14, when the probe is attached to the tuning fork, a resonance frequency of the tuning fork is decreased by 554 Hz to 32,214 Hz and a Q factor is decreased by about ¼ times to 3,700 because the effective mass of the tuning fork is increased. Accordingly, the inventive distance adjusting unit applies a frequency, which corresponds to the natural frequency of the tuning fork having the probe attached thereto (that is, 32214 Hz), to the tuning fork.

Meanwhile, when the probe is approached to a surface of the sample while an AC current having a frequency identical to a resonance frequency of the tuning fork having the probe attached thereto is applied to the tuning fork, the resonance frequency and the Q factor of the tuning fork begins to changes in a shear force region where the probe and the surface of the sample interact with each other and thus the output current from the tuning fork also changes.

Figure 15:
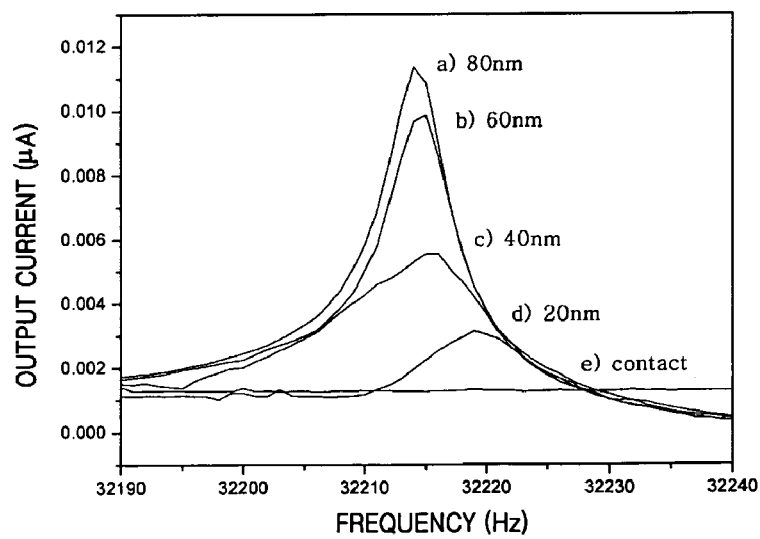
FIG. 15 is a graph illustrating resonance characteristics of a tuning fork when a probe is gradually approached to a surface of a sample by 20 nanometers.

FIG. 15 is a graph illustrating resonance characteristics of the tuning fork when the probe is gradually approached to the surface of the sample by 20 nanometers. As known from the graph shown in FIG. 15, as the distance between the probe and the surface of the sample is decreased, a resonance frequency is increased and an output current at the resonance frequency is gradually decreased.

Figure 16:
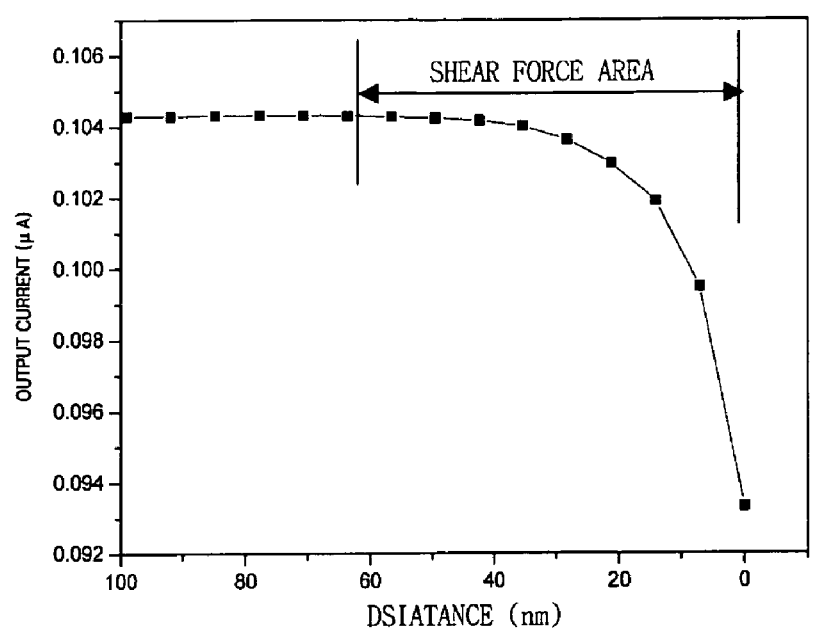
FIG. 16 is an approach curve where a probe is gradually approached to a sample by an interval with a tuning fork being vibrated with a resonance frequency.

FIG. 16 is an approach curve where the probe is gradually approached to a sample by a predetermined interval with the tuning fork being vibrated with the resonance frequency. As shown in FIG. 16, as the distance between the probe and the sample is decreased, the value of an output signal is rapidly decreased from about 60 nanometers. At a more distant position, a constant output signal is generated regardless of a change in distance. This means that there is no interaction between the sample and the probe. The interaction is started from a region where the value of an output signal starts to be decreased, and the value of the output signal is furthermore decreased as the distance between the probe and the sample is decreased. It can be known from the above result that the interaction between the probe and the sample depends on the distance between probe and the sample.

Accordingly, the distance between the probe and the sample can be constantly maintained to several through several-ten nanometers. For example, experimental data on the relationship between the distance (between the probe and the sample) and the output current at the resonance frequency of the tuning fork may be prestored in a look-up table in the central processing unit 10. Thereafter, when the value of an output current, which is measured when the probe 60 is approached to the sample 80, is sent to the central processing unit 10, the central processing unit 10 can ascertain the distance between the probe and the sample on the basis of the look-up table. Also, when the distance between the probe and the sample is desired to be maintained to a constant value, a current corresponding to the desired distance is determined as a reference current on the basis of the look-up table and then an output current from the lock-in amplifier 65 is compared with the reference current. If the output current is determined to be larger than the reference current, the probe 60 is further approached to the sample 80 through the moving unit 40. Otherwise, if not, the probe 60 is further retreated from the sample 80.

An operation and function of the inventive near-field microscope will now be described briefly with reference to FIG. 3.

Referring back to FIG. 3, the central processing unit 10 first controls a resonance frequency, impedance and an electromagnetic wave mode of the dielectric resonator 50 according to user's manipulation, and generates visual data on an surface shape of the sample 80 by analyzing result data obtained from the detector 30. The image processing unit 70 displays a minute surface image of the sample 80 on the basis of the generated visual data. The wave source 20 generates a microwave and supplies the microwave to the dielectric resonator 50. At this time, under the control of the central processing unit 10, the wave source 20 may generate a microwave having only a specific frequency or may generate a microwave spectrum having plural frequencies. For example, the wave source 20 may be an HP83620A providing a stable microwave in the range of about 10 MHz through 20 GHz.

The microwave generated from the wave source 20 is supplied through the input line 54 into the dielectric resonator 50. Then, a microwave spectrum with a distribution shape having the maximum value at the resonance frequency of the dielectric resonator 50 is applied through the probe 60 to the sample 80. A microwave deformed by an interaction between the probe 60 and the sample 80 is re-applied through the probe 60 to the dielectric resonator 50, and the detector 30 detects the deformed and applied microwave and transmits the resulting data to the central processing unit 10. The detector 30 may include a power meter 31 for measuring the intensity of the deformed microwave, and a spectrum analyzer 34 for measuring a frequency of the deformed microwave. The central processing unit 10 calculates a surface shape of the sample 80 by comparing the intensity and frequency of the deformed microwave with those of an input microwave, and transmits the resulting image data to the image processing unit 70. Here, an image processing method including an algorithm for generating image data is well-known to those skilled in the art, and thus a description thereof will be omitted for simplicity.

When a measuring process for one portion of the sample 80 is completed in the above manner, the same measuring process for another portion of the sample 80 is performed by moving the dielectric resonator 50 to the another portion through the moving unit 40 under the control of the central processing unit 10. At this time, it is preferable to moving the dielectric resonator 50 so that an interval between neighboring portions to be measured may be 0.02 μm. Also, since a visually smooth surface of the sample may be very rough microscopically, the distance between the probe 60 and the sample 80 may be minutely changed during the movement of the dielectric resonator 50. Accordingly, the distance between the probe 60 and the sample 80 must be constantly maintained by the distance adjusting unit during the movement of the dielectric resonator 50.

Meanwhile, as aforementioned, the dielectric resonator must be matched with peripheral devices so that power can be maximally transmitted between the dielectric resonator and the peripheral devices. For this purpose, the detector may further include a network analyzer 32 for detecting the characteristics of the dielectric resonator 50, such as impedance and a resonance frequency. That is, according to the present invention, while observing the analysis result from the network analyzer 32, a user matches the dielectric resonator 50 to the external devices by rotating the coupling loops of the input and output lines and the tuning screw 52. The coupling loops and the tuning screw 52 may be controlled to be rotated by a predetermined angle through the manipulation of the central processing unit 10. This matching process may be performed prior to the measurement of the sample 80, or may be performed during the measurement of the sample 80 because a matching condition can be changed due to an interaction between the probe 60 and the sample 80.

Figure 17A:
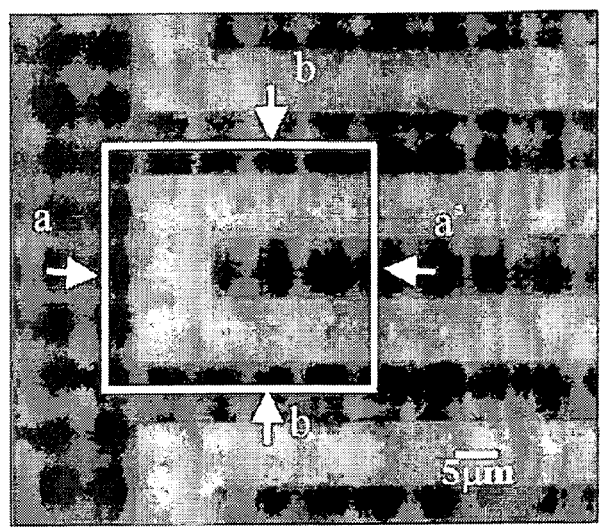
FIG. 17A is an optical image of a sample.
Figure 17B:
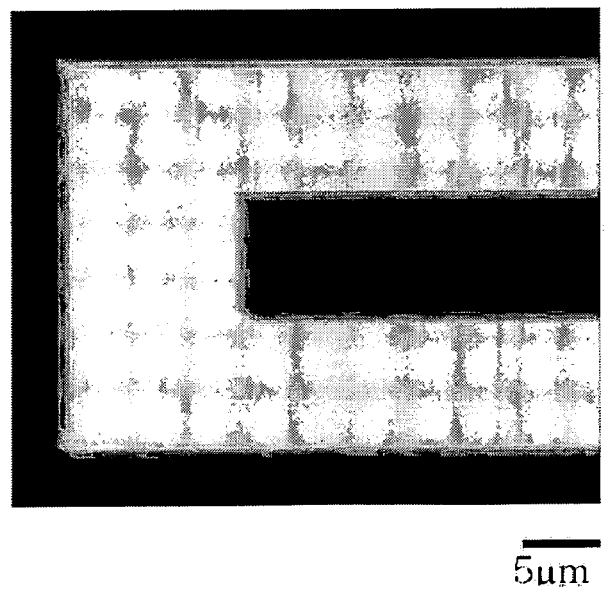
FIG. 17B is a two-dimensional image of the sample, which is obtained through a near-field scanning microwave microscope according to the present invention.

FIG. 17A is an optical image of the sample, and FIG. 17B is a two-dimensional image of the sample, which is obtained through the near-field scanning microwave microscope. In the experiment, the strength of a signal output from the dielectric resonator 50 is measured with the power meter 31. At this time, a frequency of 4.46 GHz is used. Of course, an impedance matching is performed on the dielectric resonator 50 prior to the experiment.

Figure 17C:
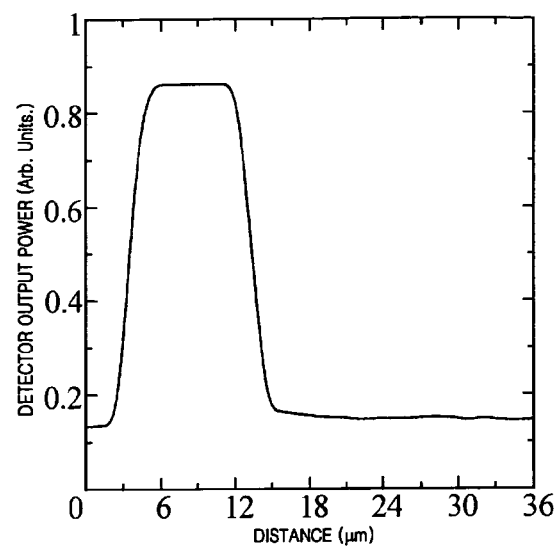
FIG. 17C is a sectional view of the sample taken along line a–a' in FIG. 17A.
Figure 17D:
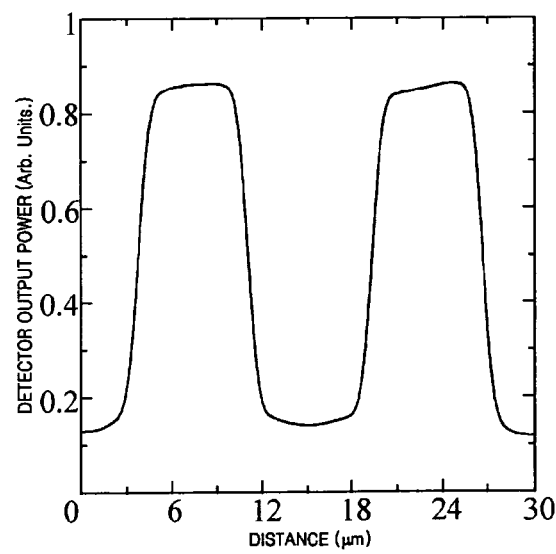
FIG. 17D is a sectional view of the sample taken along line b–b' in FIG. 17A.

FIG. 17C is a sectional view of the sample taken along line a–a' in FIG. 17A, and FIG. 17D is a sectional view of the sample taken along line b–b' in FIG. 17A. Spatial resolution at the a–a' section can be calculated as follows:

Referring to FIG. 17C, a measured width at a half point of the maximum output power line is 7.6 μm. A width of an actually-used chrome line pattern is 6.6 μm. Accordingly, the difference "1 μm" between the measured width and the chrome line width corresponds to the spatial resolution of the inventive near-field microscope.

As stated above, the inventive near-field microscope measures a change in input resistance and a resonance frequency due to an interaction between the sample and a microwave transmitted through the probe attached to the dielectric resonator, thereby making it possible to find out an optical characteristic of the sample. The inventive near-field microscope has the following advantages due to a structural characteristic of the dielectric resonator.

First, the inventive near-field microscope can be miniaturized because it uses a dielectric of a high dielectric constant.

Second, the inventive near-field microscope is less influenced by external environments such as temperature not only because it uses a stable dielectric but also because its dielectric is sealed with the metal resonator.

Third, the inventive near-field microscope makes it possible to easily adjust the distance between the probe and the sample by using the probe and the tuning fork and to observe the sample in various directions.

Fourth, the inventive near-field microscope using the dielectric resonator makes it possible to observe the sample in an optimal mode selected suitably according to the types of the sample because it can use various modes such as TE, TM and TEM.

Lastly, the inventive near-field microscope can enhance its sensitivity and resolution because it uses the hybrid-tip probe.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A near-field microscope comprising:
   a wave source generating a wave, a frequency of the wave being adjustable by the wave source;
   a dielectric resonator propagating the wave from the wave source, a resonance frequency, impedance, a Q factor and an electromagnetic wave mode thereof being freely adjustable;
   a probe scanning the wave output from the dielectric resonator on a sample;
   a distance adjusting unit measuring a distance between the probe and the sample and maintaining the distance to a predetermined value; and
   a detector detecting a wave that propagates through the probe, interacts with the sample and then propagates through the probe and the dielectric resonator,
   wherein the distance adjusting unit comprises:
      a tuning fork on a surface of which the probe is attached; and
      a lock-in amplifier applying an AC voltage to the tuning fork and measuring a value of an output current from the tuning fork, the AC voltage having a frequency corresponding to a resonance frequency of the tuning fork having the probe attached on one side surface thereof.

2. The near-field microscope of claim 1, further comprising a moving unit moving a relative position between the sample and the dielectric resonator.

3. The near-field microscope of claim 1, wherein the wave source generates a wave having a specific frequency.

4. The near-field microscope of claim 1, wherein the wave source generates a wave spectrum having plural frequencies.

5. The near-field microscope of claim 1, wherein the dielectric resonator comprises:
   a dielectric;
   a metal resonator surrounding the dielectric, the metal resonator being spaced apart from the dielectric by a predetermined interval;
   an input line supplying the wave generated by the wave source to the dielectric resonator; and
   an output line supplying the wave that interacts with the sample and then propagates through the probe into the dielectric resonator to the detector.

6. The near-field microscope of claim 5, wherein the input line and the output line are installed to penetrate the metal resonator, and an end portion of the input line and an end portion of the output line are positioned between the dielectric and an inner wall of the metal resonator to face the dielectric.

7. The near-field microscope of claim 6, wherein the end portion of the input line and the end portion of the output line each are a straight-line type or are bent at an angle to form a coupling loop.

8. The near-field microscope of claim 7, wherein the resonance frequency, the impedance, the Q factor and the electromagnetic wave mode are adjusted by rotating a first coupling loop formed at the end portion of the input line and a second coupling loop formed at the end portion of the output line.

9. The near-field microscope of claim 8, wherein the impedance is adjusted to be maintained at 50Ω.

10. The near-field microscope of claim 5, further comprising a tuning unit minutely adjusting the resonance frequency and the impedance of the dielectric resonator.

11. The near-field microscope of claim 10, wherein the tuning unit is a screw installed to penetrate the metal resonator and face the dielectric.

12. The near-field microscope of claim 11, wherein the screw adjusts the resonance frequency, the impedance, the Q factor and the electromagnetic wave mode through adjustment of its insertion depth into the dielectric resonator.

13. The near-field microscope of claim 5, wherein the probe is installed in such a way that one end portion thereof faces the sample and other end portion thereof penetrates the metal resonator and faces the dielectric.

14. The near-field microscope of claim 13, wherein the other end portion of the probe is a straight-line type or is bent at an angle to form a coupling loop.

15. The near-field microscope of claim 13, wherein the probe is a hybrid-tip probe manufactured to have a body portion of a constant diameter and a rapidly tapered apex portion.

16. The near-field microscope of claim 15, wherein the body portion has a diameter of about 1 mm and the tapered apex portion has diameters of about 1 through 10 μm.

17. The near-field microscope of claim 13, wherein the probe is made of at least one of metallic material, dielectric material and magnetic material.

18. The near-field microscope of claim 1, wherein the distance between the probe and the sample is measured using the output current value and a look-up table in which a relationship between the distance and the value of the output current is prestored.

19. The near-field microscope of claim 1, wherein the distance is adjusted to a desired value by adjusting the output current value to a reference value through feedback between the distance and the output current value.

20. The near-field microscope of claim 1, wherein the detector comprises:
   a power meter measuring the intensity of the wave that interacts with the sample and then propagates through the probe and the dielectric resonator; and
   a spectrum analyzer measuring a frequency of the wave that interacts with the sample and then propagates through the probe and the dielectric resonator.

21. The near-field microscope of claim 20, wherein the detector further comprises a network analyzer measuring an insertion loss and a matching state of the dielectric resonator.

22. The near-field microscope of claim 1, further comprising:
   a central processing unit generating visible image data by analyzing result data output from the detector; and
   an image processing unit displaying the image data generated by the central processing unit.

* * * * *